(12) United States Patent
Dynes et al.

(10) Patent No.: US 8,755,687 B2
(45) Date of Patent: Jun. 17, 2014

(54) COMMUNICATION SYSTEM AND METHOD (75) Inventors: James Dynes, Cambridge (GB);
Zhiliang Yuan, Cambridge (GB);
Andrew W. Sharpe, Cambridge (GB);
Andrew James Shields, Cambridge (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 107 days.

(21) Appl. No.: 13/476,816

(22) Filed: May 21, 2012

(65) Prior Publication Data
US 2012/0294625 A1 Nov. 22, 2012

(30) Foreign Application Priority Data
May 19, 2011 (GB) .................................. 1108459.7

(51) Int. Cl.
*H04B 10/00* (2013.01)
(52) U.S. Cl.
USPC ............................................ 398/40; 398/155
(58) Field of Classification Search
USPC ............................................ 398/40, 146, 155
See application file for complete search history.

(56) References Cited

U.S. PATENT DOCUMENTS

| 5,675,648 A | 10/1997 | Townsend |
| 5,768,378 A * | 6/1998 | Townsend et al. ............. 380/256 |
| 7,580,524 B2 * | 8/2009 | Gisin et al. .................... 380/256 |
| 7,786,786 B2 * | 8/2010 | Kirichenko ..................... 327/295 |
| 2005/0078827 A1 | 4/2005 | Tajima |
| 2005/0100351 A1 * | 5/2005 | Yuan et al. ..................... 398/214 |
| 2008/0292102 A1 * | 11/2008 | Wang et al. .................... 380/275 |

OTHER PUBLICATIONS

Lijun Ma et al., "High Speed Quantum Key Distribution Over Optical Fiber Network System", Journal of Research of the Nation Institute of Standards and Technology, vol. 114, No. 2, May-Jun. 2009, pp. 149-177.
Akihisa Tomita et al., "High Speed Quantum Key Distribution System", Optical Fiber Technology 16 (2010)pp. 55-62.

* cited by examiner

*Primary Examiner* — Dalzid Singh
(74) *Attorney, Agent, or Firm* — Oblon, Spivak, McClelland, Maier & Neustadt, L.L.P.

(57) ABSTRACT

A communication system comprising an emitter of weak light pulses, a detector which is capable of detecting single photons, and a source of a clock signal, wherein said emitter and detector are synchronized using said clock signal, the system further comprising a frequency divider for said clock signal to produce a reduced frequency clock signal and a clock regenerator for regenerating the original clock signal from the reduced frequency clock signal, the system further comprising a communication channel configured to communicate the clock signal between the emitter and detector, the clock signal being reduced before sending through said channel and reconstructed after it has exited said channel.

16 Claims, 9 Drawing Sheets
(7 of 9 Drawing Sheet(s) Filed in Color)

COMMUNICATION SYSTEM AND METHOD

FIELD

Embodiments described herein relate generally to communication systems, components of communication systems and communication methods.

BACKGROUND

Communication systems using single photon detectors are usually, but not limited to quantum communication systems. For quantum communication systems, information is sent between a transmitter and a receiver by encoded single quanta, such as single photons. Each photon carries one bit of information encoded upon a property of the photon, such as its polarisation, phase or energy/time and are termed quantum signals. The photon may even carry more than one bit of information, for example, by using properties such as angular momentum.

An example of a quantum communication is quantum key distribution (QKD) which results in the sharing of cryptographic keys between two parties; a transmitter, often referred to as "Alice", and a receiver often referred to as "Bob". The attraction of this technique is that it provides a test of whether any part of the key can be known to an unauthorised eavesdropper (Eve). In many forms of quantum key distribution, Alice and Bob use two or more non-orthogonal bases in which to encode the bit values. The laws of quantum mechanics dictate that measurement of the photons by Eve without prior knowledge of the encoding basis of each causes an unavoidable change to the state of some of the photons. These changes to the states of the photons will cause errors in the bit values sent between Alice and Bob. By comparing a part of their common bit string, Alice and Bob can thus determine if Eve has gained information.

For successful operation of communication systems employing gated single photon detectors, there is a need to synchronize the transmitter and the receiver of the communication system.

In classical communication, synchronization is straightforward as the (classical) signals that are sent from the transmitter are of strong intensity and consequently regularly detected by the receiver. As such the regularity of the received signals can be used to regenerate the original transmitter clock at the receiver via standard clock recovery techniques. In this way, the transmitter and receiver operate at the same clock frequency allowing accurate time slot assignment of the received signals. However, in communication with single photons, the single photon (quantum) signals that are transmitted are of extremely weak intensity. Due to attenuation and single photon detector inefficiency the number of quantum signals detected by the receiver is much less than what was originally transmitted. The sparseness of the detected quantum signals means standard classical clock recovery techniques are not possible.

BRIEF DESCRIPTION OF THE DRAWINGS

The patent or application file contains at least one drawing executed in color. Copies of this patent or patent application publication with color drawing(s) will be provided by the office upon request and payment of the necessary fee Embodiments will now be described with reference to the following figures.

DETAILED DESCRIPTION

According to one embodiment a communication system is provided comprising an emitter of weak light pulses, a detector which is capable of detecting single photons, and a source of a clock signal, wherein said emitter and detector are synchronised using said clock signal, the system further comprising a frequency divider for said clock signal to produce a reduced frequency clock signal and a clock regenerator for regenerating the original clock signal from the reduced frequency clock signal, the system further comprising a communication channel configured to communicate the clock signal between the emitter and detector, the clock signal being reduced in frequency before sending through said channel and reconstructed after it has exited said channel.

The detector which detects the single photons may be a high speed detector. For example, an avalanche photo-diode detector may be used. The detector may be gated. In one embodiment, the detector is a high speed gated detector which is gated at a frequency of at least 100 MHz.

In one embodiment, the system further comprises an output circuit configured to isolate the avalanche signal from the output of said detector using a self-differencing technique. One possible arrangement for such an output circuit comprises a signal divider to split the output signal of the detector into two parts, an electrical line to delay one of the parts with relative to the other and a signal differencer to output the difference between the two parts.

The output circuit may also comprise a potentiometer configured to balance the strength of the two parts of the output signal. A variable delay line may also be provided to allow tuning of the delay between the two parts of the signal. An amplifier may be provided to amplify the output of the self-differencing circuit(s).

In an embodiment, the frequency divider reduces the frequency by a factor of 10 or more. In further embodiments, the frequency is reduced by a factor of at least 50. In one embodiment the frequency is reduced by a factor of 100. 10 MHz is a widely used frequency in industry which is use to lock pieces of equipment together and thus, in one embodiment, the clock frequency is reduced to a frequency of around 10 MHz. In this case if the detectors are gated at a frequency of 1 GHz, then the frequency could be reduced by a factor of 100 for transmission. However, if for example the system ran at 10 GHz master clock, the reduction factor could be 1000 to reduce to around 10 MHz.

In a further embodiment, the clock signal is reduced to a frequency of around 25 MHz. In an embodiment, the frequency is reduced to somewhere in the range of 5 to 50 MHz.

The clock signal can be sent from the emitter side to the detector side or vice versa. Thus, in one embodiment, the source of the clock signal and frequency divider are located with the emitter and the clock regenerator is located with the detector. However, in a further embodiment, the source of the clock signal and frequency divider are located with the detector and the clock regenerator is located with the emitter.

In a further embodiment, the source of the clock signal and frequency divider are located with the detector and the clock regenerator is located with the emitter, the source of the clock signal comprising a voltage controlled oscillator, and wherein a signal from the output circuit which performs self differencing is connected to voltage controlled oscillator to provide a feedback signal to said voltage controlled oscillator. This allows the clock signal frequency to be precisely tuned to the inverse delay of the self-differencing circuit.

In one embodiment, the reduced frequency clock signal is transmitted over the same channel as the signal from the emitter, using wavelength division multiplexing.

The system can be configured as a quantum communication system. For example, it may be used to communicate a key using a quantum communication protocol.

In a further embodiment, a unit for a communication system is provided, said unit comprising a source of a clock signal, a component configured to handle weak light pulses in accordance with said clock signal, said component being selected from an emitter of weak light pulses, wherein the average number of photons in each weak light pulse is less than 1, or a detector which is capable of detecting single photons, the unit further comprising a frequency divider configured to reduce the frequency of the clock signal and a transmission line configured to transmit a reduced frequency clock signal out of the unit.

The above unit may be configured as the transmitting side and comprise an emitter or as the receiving side and comprise a detector.

In a further embodiment, a unit for a communication system is provided, said unit comprising a receiver of a reduced frequency clock signal, a clock regenerator configured to regenerate a clock signal from the reduced frequency clock signal and a component configured to handle weak light pulses in accordance with said clock signal, said component being selected from an emitter of weak light pulses, wherein the average number of photons in each weak light pulse is less than 1, or a detector which is capable of detecting single photons.

The above unit may be configured as the transmitting side and comprise an emitter or as the receiving side and comprise a detector.

In the above, the emitter emits light pulses in accordance the clock signal and the detector is gated in accordance with the clock signal. However, it should be noted that the emitter may not emit a photon pulse in every clock cycle, also the detector may not detect a photon in every clock cycle.

In a further embodiment, a communication method is provided comprising:
  generating weak light pulses using an emitter,
  detecting said weak light pulses using a detector which is capable of detecting single photons;
  providing a clock signal to synchronise said detector with the emitter, wherein providing a clock signal comprises generating a clock signal at a first frequency, providing said clock signal at said first frequency to one of the emitter or detector; dividing the frequency of the clock signal to produce a reduced frequency clock signal and regenerating the clock signal at the first frequency from the reduced frequency clock signal before supplying to the other of the emitter or detector, wherein said emitter and detector are spatially separated and a communication channel is provided to communicate the reduced frequency clock signal between the emitter and detector.

Figure 1:
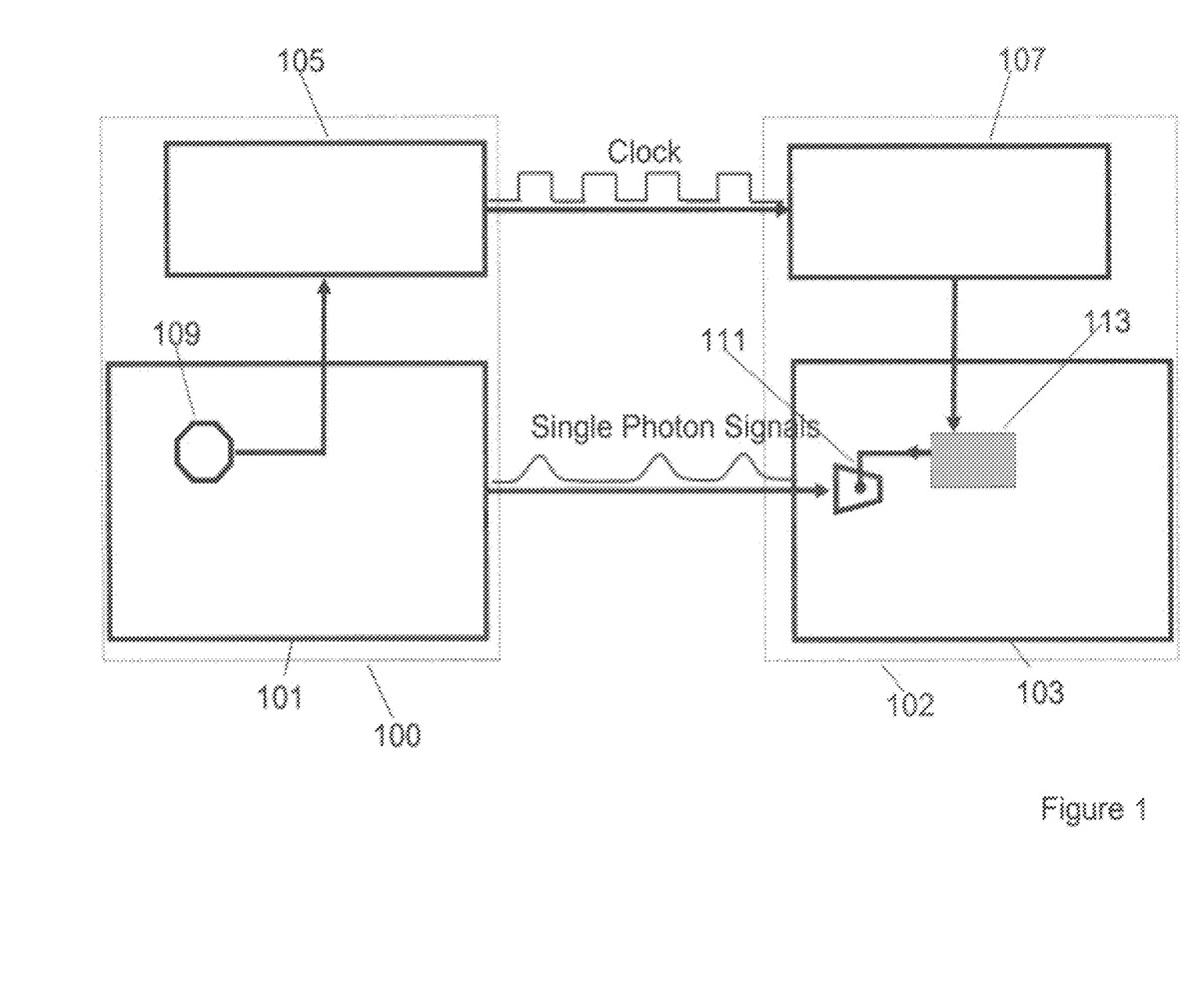
FIG. 1 is a schematic of a prior art communication system with low speed single photon detectors.

FIG. 1 is a schematic of a communication system. The communication system sends information from a transmission section 100 to a receiving section 102.

In the case of quantum communication systems, information is encoded onto weak light pulses by changing a quantum parameter of the photons in the pulses such as polarisation or phase. The weak light pulses will, on average, contain less than one photon. The details of the quantum communication protocol which is used to encode the information on the weak light pulses will not be discussed. However, it is understood that any quantum communication protocol could be used, such as BB84, B92 etc, where single photon detectors are used as the detection units for single photon signals.

The transmission section 100 comprises a transmitter of weak light pulses which will be referred to as a single photon transmitter 101. The single photon transmitter is linked to a single photon receiver 103 by a single photon channel. The single photon receiver 103 is located within receiving section 102. The single photon receiver 103 is a receiver which is capable of detecting a light pulse which contains a single photon.

In the case of a quantum communication system, the single photon channel forms the quantum signal channel.

The transmission section 100 also comprises a clock transmitter, 105. The receiving section 102 comprises a clock receiver 107. The clock transmitter 105 is connected to the clock receiver 107 by a clock channel.

In the case of a quantum communication system, this clock channel forms the classical channel. Usually both the single photon and clock channels are optical fibres and can either be separate fibres, or as is the case for deployed optical fibre, the optical fibres are bound together as bundles.

Single photon transmitter 101 comprises a master clock 109. The master clock emits a pulse pattern at the master clock rate which forms the clock rate of the system. The single photon transmitter 101 sends single photons at the master clock rate to the receiver over the single photon channel. Master clock 109 also generates electrical signal to be used by the clock transmitter 105. Usually clock transmitter 105 transforms this signal into an optical signal before being transmitted through the clock channel.

At the clock receiver 107, optical pulses from the clock channel are transformed to electrical pulses. Typically, the clock pulses are used as trigger pulses to trigger a separate set of pulse shaping electronics, 113. This allows a desired pulse shape to be selected in order to drive the single photon detectors. However, sometimes, this arrangement reduces the speed of the system. These shaped electrical pulses are then used to directly drive the single photon detector(s) 111 in the receiver so they become single photon sensitive at the time of arrival of the single photons. There may be one or more single photon detectors at the receiver depending on the communication protocol being implemented.

The entire system operates at a single clock frequency and the single photon detectors can only be operated at low frequencies of a few MHz due to the reasons stated in the last paragraph.

Figure 2:
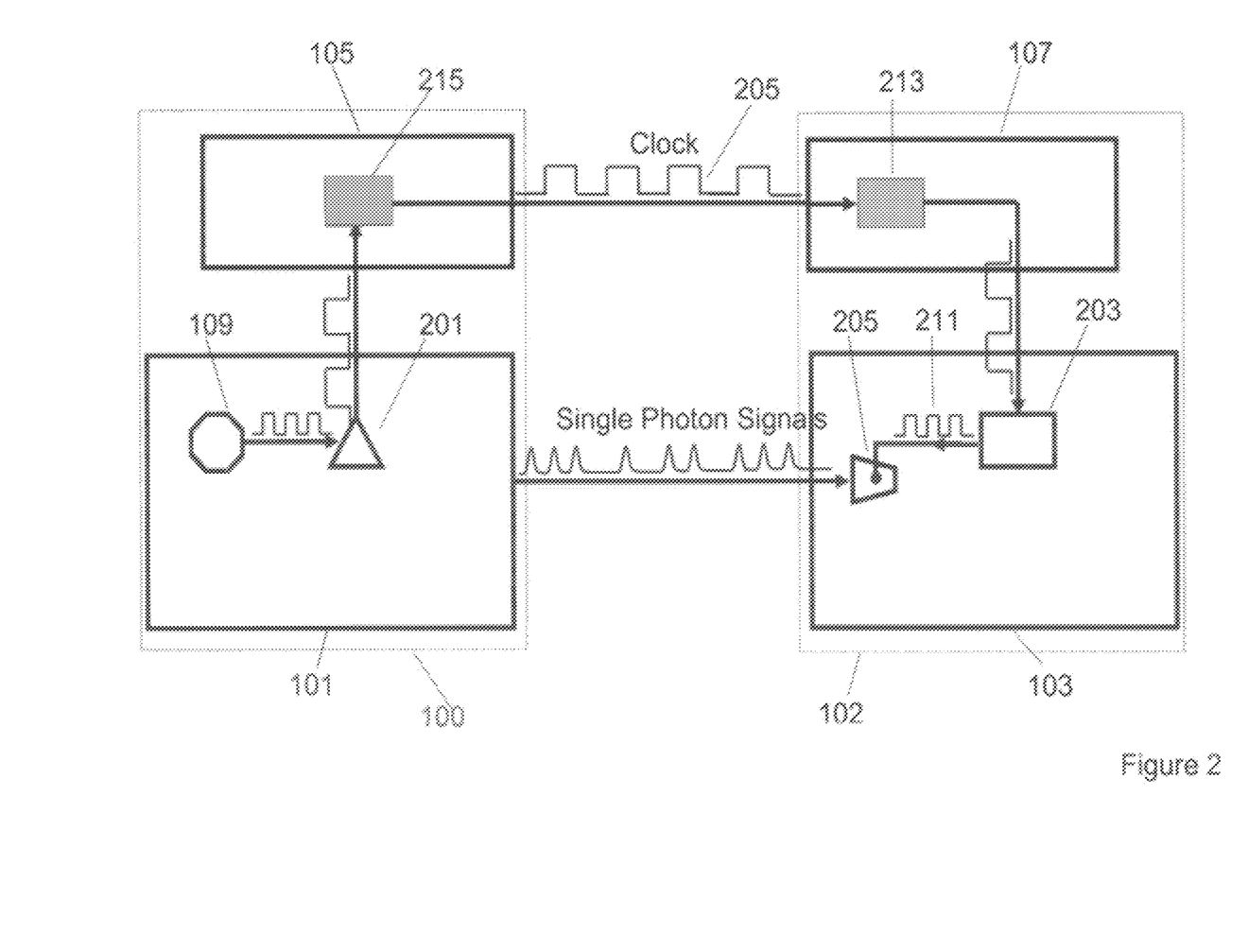
FIG. 2 is a schematic of a communication system in accordance with an embodiment of the present invention with high speed single photon detectors using low speed clock transmission, clock regeneration and frequency synthesis.

FIG. 2 shows a quantum communication system in accordance with an embodiment. To avoid any unnecessary repetition, like reference numerals will be used to denote like features.

The transmission section 100 comprises a single photon transmitter 101 and a clock transmission unit 105. As before, the transmission section 100 comprises a master clock 109. The single photon transmitter 101 comprises a clock divider 201. The clock divider 201 divides the master clock signal 109 to some preset divided frequency, N. The clock transmission unit 105 comprises a unit 215 for transmitting divided clock signal 205.

In one embodiment, an ovenised master clock is employed as it will have exemplary timing stability. In one embodiment, the pre-set divided signal will have a frequency that is one to three orders of magnitude smaller than the master clock.

In one embodiment, this divided clock is converted to an optical signal, with clock transmitter 105. This may be performed using a coarse division wavelength multiplexed (CWDM) laser diode; although a dense division wavelength multiplexed (DWDM) laser diode could be used. The optical signal, 205 is then sent through the clock channel to the clock receiver 107.

The above arrangement permits the divided clock to be wavelength multiplexed with other (classical) data channels. For example, in one embodiment, the frequency divided clock is transmitted with a CWDM laser at a wavelength of 1550 nm. Then two additional (classical) data channels forming a bi-directional link between the transmitter and the receiver could operate independently at the CWDM wavelengths 1571 nm and 1591 nm.

Of course, other wavelengths could be used on the CWDM spectrum or the DWDM spectrum.

At the clock receiver, 107, the frequency divided clock 205 is converted into an electrical signal by a clock regenerator. In one embodiment, this is performed using an avalanche photodiode 213. However, any photoreceiver could be used. Clock receiver, 107 sends this clock regenerated signal to a frequency synthesizer 203 in single photon receiver, 103. The purpose of the frequency synthesizer 203 is to track the input variations of the clock signal, 205 and generate a frequency multiplied version of the clock signal.

In one embodiment, the frequency synthesizer 203 is realised by a phase locked loop (PLL). PLL's are readily available as 'on chip' devices. Such devices allow a preset frequency multiplier for the output frequency. In one embodiment, this multiplier 203 is set at the value N to regenerate the original high frequency master clock output, 109 (in the transmission section 100). Any variations in the input clock frequency will then be automatically tracked by the frequency synthesizer thus keeping both single transmitter master clock and the single photon receiver master clock in phase.

Therefore, in this embodiment, the regenerated single photon transmitter master clock can have very low jitter and excellent timing performance due to the properties of the frequency synthesizer. This regenerated master clock is used to directly drive high speed (GHz or higher) gated single photon detector(s) 205 which are synchronized to the incoming single photon data signals. The regenerated master clock can also be used to drive high speed electronics in the single photon receiver.

It is difficult to send strong optical signals travelling along the same channel as the single photon signals. Strong optical signals will introduce strong optical scattering which contaminates the single photon signals.

However, if the frequency divided clock has a frequency much lower than the clock rate of the communication system, the optical power for transmitting the frequency divided clock will be lower which allows the possibility of wavelength multiplexing the single photon channel with the synchronization channel. This reduces the number of optical fibres linking the transmitter and the receiver to just one optical fibre which has considerable cost savings.

The above embodiment, allows use of high speed single photon detectors with clock regeneration and frequency synthesis for synchronization.

The current trend in quantum communication is to operate quantum communication systems at high (GHz) clock rates and operate over long optical fibre distances. Nevertheless, any non-zero fibre distance between a transmitter and receiver in a quantum communication system can cause synchronization problems. For example a one degree temperature increase in a 50 km stretch of fibre (equivalent to a metropolitan link) translates into a 2.5 ns propagation delay. This is equivalent to a temporal mismatch of almost three timeslots in a GHz quantum communication system.

In systems according to the above embodiment, accurate transmitter/receiver synchronization for communication systems can be achieved by accurate clock regeneration and frequency multiplication. The above system can also incorporate high speed gated detectors, for example, detectors which have a gating speed in excess of 100 MHz. Systems in accordance with the above embodiment, permit both precise time slot assignment of the detected signals as well as negligible cycle to cycle jitter for optimal performance of the high speed gated single photon detectors.

Reducing the frequency of the clock signal as it is transmitted between the transmitter and detector has advantages in that the transmitter and receiver of the reduced frequency clock signal do not have to operate at high frequencies and hence, less complex and cheaper components can be used.

Further, since the clock signal has a lower frequency during transmission, it is more robust to dispersion in the optical fibre. Optical fibre dispersion can increase the clock jitter leading to reduced single photon detector performance. It is also possible to multiplex the synchronization signals and quantum signals onto the same fibre as synchronization signal photon scattering is low using the system of FIG. 2.

In accordance with the above described embodiment, a system is provided which allows transmitter and receiver clock synchronization in a communication system based on high speed single photon detectors through clock regeneration and frequency synthesis while at the same time providing low cycle-to-cycle jitter in the frequency synthesized signal which is suitable for driving self-differencing single photon detectors.

A frequency divided clock which is sent from the transmitter to the receiver whereby the receiver employs a clock regenerator device and a frequency synthesizer to generate the transmitter master clock locally at the receiver.

In summary, systems in accordance with the above embodiment provide synchronization using a low speed transmitter/receiver which is straightforward to implement. Further, the low speed synchronization signal has a lower optical power compared with a high speed synchronization signal and thus can be wavelength multiplexed with the quantum signal channel. Systems in accordance with embodiment of the present invention also work with quantum sources at high repetition frequencies. Further, since the frequency of the clock signal is divided before transmission, the quantum source frequency is not limited. Systems in accordance with embodiments of the present invention have low timing jitter. Further, the system can be built using readily available, non-specialist components.

Figure 3:
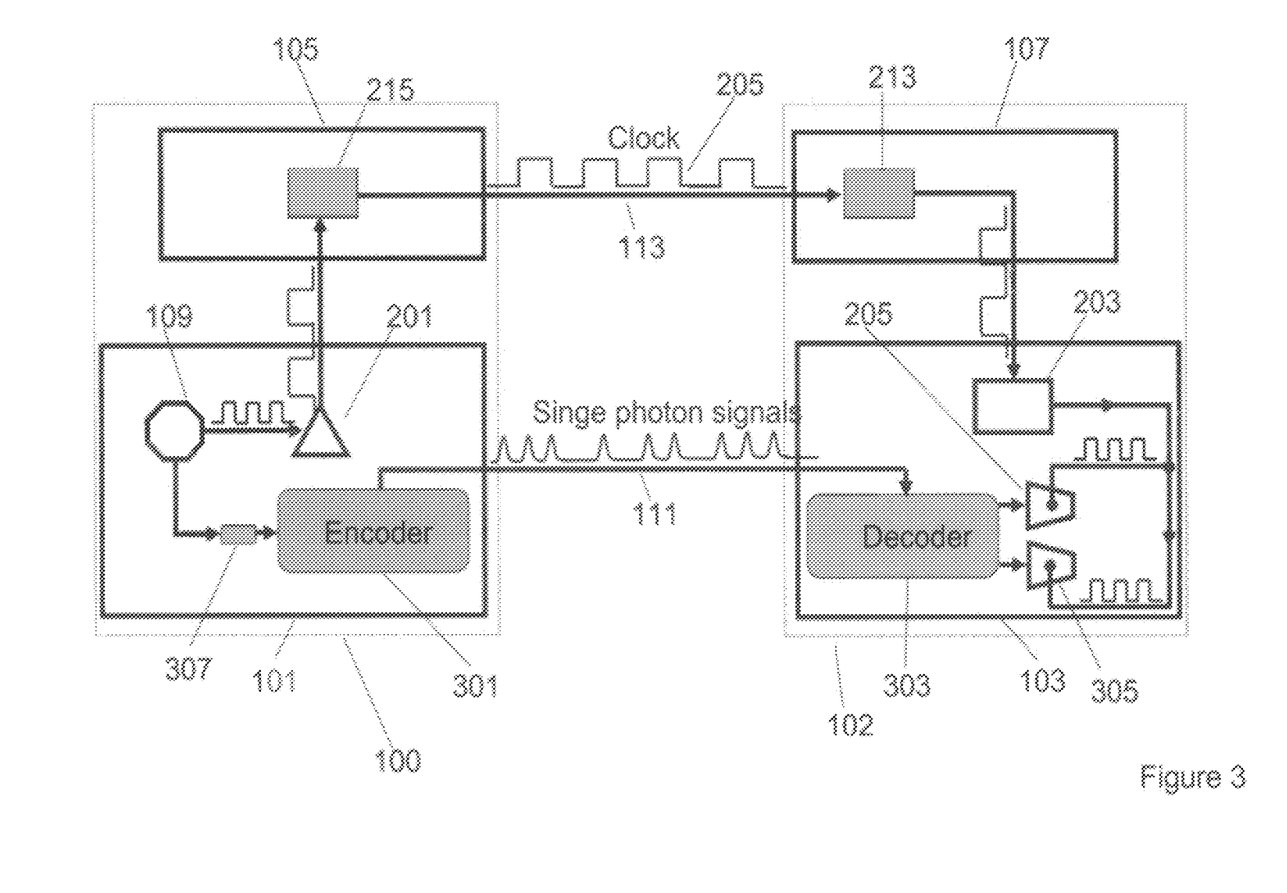
FIG. 3 is a schematic of a communication system in accordance with a further embodiment of the present invention showing a QKD quantum communication system with high speed single photon detectors using low speed clock transmission, clock regeneration and frequency synthesis.

FIG. 3 shows a quantum communication system in accordance with a further embodiment. The system of FIG. 3 is similar to that of FIG. 2. However, the system of FIG. 3 further comprises an encoder 301 and a decoder 303 which allow the system to be adapted for use in quantum communication based on quantum key distribution (QKD). The single photon transmitter 101 comprises an encoder 301. The encoder may be any type of encoder used for encoded information on to single photon or weak light pulses. For example, the encoder may be a phase encoder comprising an interferometer or it may be a polarisation encoder. Other types of encoder are possible. Any type of QKD quantum communication protocol could be used where single photon detectors are used as the detection units for quantum signals.

Single photon transmitter 101 is linked to single photon receiver 103 by two optical fibres, a quantum signal channel 111 and a classical synchronization channel 113. These optical fibres can either be separate fibres, or as is the case for deployed optical fibre, the optical fibres are bound together as bundles.

Single photon transmitter 101 comprises single photon source 307, master clock 109 and encoder 301, which in this embodiment is an interferometer 301 to allow phase encoding.

In one embodiment, an ovenised master clock is employed as it will have exemplary timing stability. The master clock emits a pulse pattern at the clock rate of the system to control the single photon source. Consequently single photon source emits pulses of photons at the master clock frequency. In one embodiment, the optical pulses will be in the telecom band, e.g. a wavelength of 1550 nm. These optical pulses are sent through the encoding interferometer 301 where information is encoded on the optical pulses. Finally, if a laser is used instead of single photon source 307, the optical pulses are attenuated to the single photon level before being sent through the quantum signal channel fibre, 111.

Single photon transmitter master clock 109 also generates electrical signal at the clock rate of the system. At the single photon transmitter 101, a clock divider 201 divides the master clock signal, 109 to some pre-set divided frequency, N. In one embodiment, the pre-set divided signal will have a frequency that is one to three orders of magnitude smaller than the master clock.

In one embodiment, this divided clock is converted to an optical signal, with clock transmitter 105. In one embodiment, this is performed using a coarse division wavelength multiplexed (CWDM) laser diode; although a dense division wavelength multiplexed (DWDM) laser diode could be used. The optical signal 205 is then sent through the clock channel to the clock receiver 107.

At the clock receiver 107, the frequency divided clock 205 is converted into an electrical signal by a clock regenerator. In one embodiment, this is performed using an avalanche photodiode 213. However any photoreceiver could be used. Clock receiver, 107 sends this clock regenerated signal to a frequency synthesizer in single photon receiver 103.

Single photon receiver 103 comprises frequency synthesizer, 203 decoding interferometer, 303 and single photon detectors. Two single photon detectors 205, 305 are shown in FIG. 3, although there maybe more detectors depending on the quantum communication protocol selected. Optical pulses from the quantum signal channel 111 are sent through the decoding interferometer 303.

The purpose of the frequency synthesizer, 203 is to track the input variations of the clock signal, 205 and generate a frequency multiplied version of the clock signal. In one embodiment, the frequency synthesizer is realised by a phase locked loop (PLL). PLL's are readily available as on chip devices. Such devices allow a preset frequency multiplier for the output frequency. In embodiments, this multiplier is set at the value N to regenerate the original high frequency master clock output, 109 (at the data transmitter). Any variations in the input clock frequency will be automatically tracked by the frequency synthesizer thus keeping both single transmitter master clock and the single photon receiver master clock in phase.

The regenerated master clock is used to drive both gated single photon detector(s) 205 & 305 which are synchronized to the single photon signals emanating from the decoder 303. The single photon detectors 205 and 305 detect the single photons from the decoder and this information is used to form a key between the transmitter and the receiver The regenerated master clock can also be used to drive high speed electronics in the single photon receiver.

Figure 4:
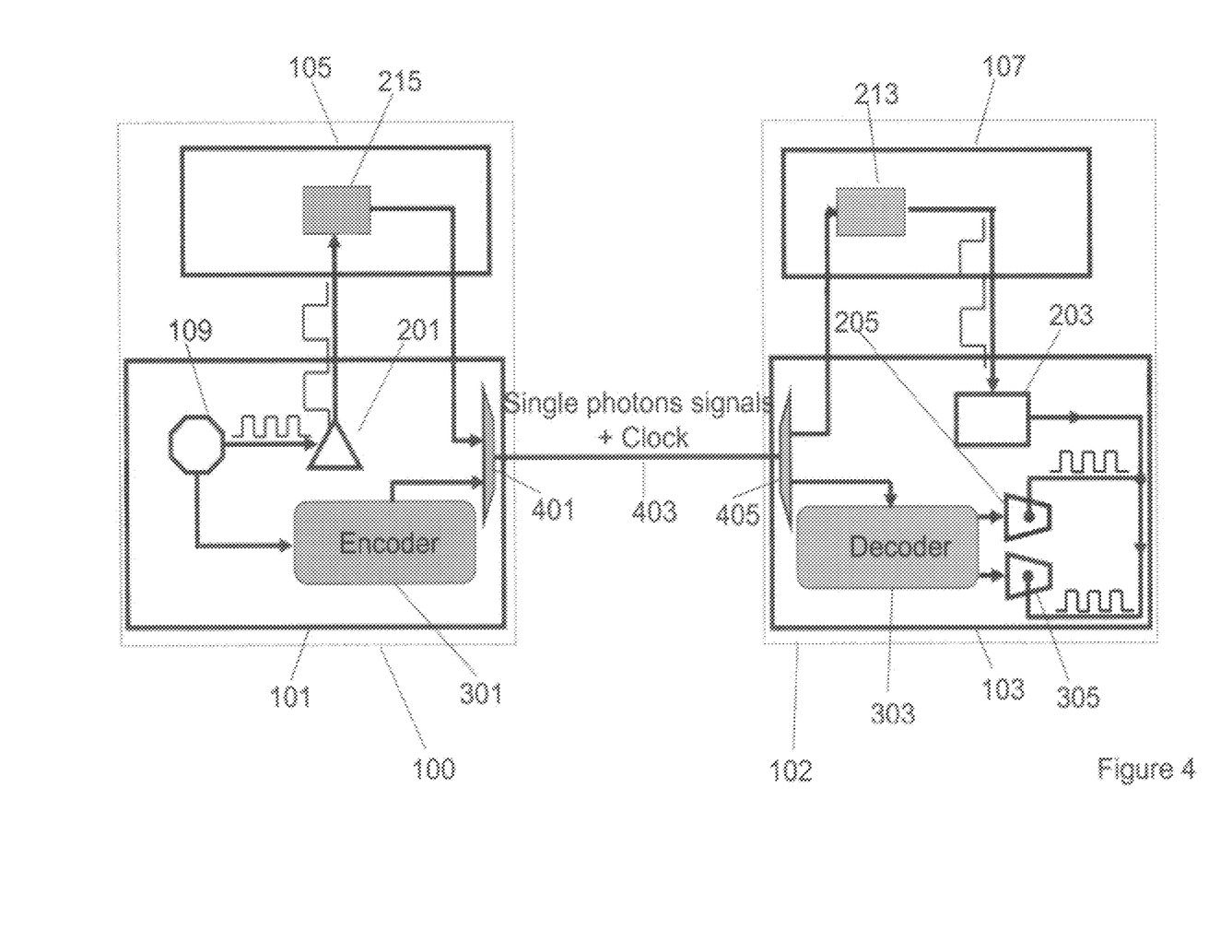
FIG. 4 is a schematic of a communication system in accordance with a further embodiment of the present invention showing a QKD quantum communication system with high speed single photon detectors using low speed clock transmission wavelength multiplexed with the quantum channel, clock regeneration and frequency synthesis.

FIG. 4 is a schematic of a quantum communication system in accordance with a further embodiment. The system of FIG. 4 is a wavelength division multiplexed analogue of the quantum communication system described with reference to FIG. 3. In this case, both the quantum channel and classical synchronization channel are wavelength multiplexed onto the same single fibre, 403. Wavelength division multiplexing in this case is achieved via DWDM mux and demux units in the transmitter 401 and receiver 405.

Proper choice of the transmission wavelength for the transmitter 401 and receiver 405 will depend on the transmission wavelength of the quantum signals along the quantum channel. Generally, strong optical signals will cause light scattering in the optical fibre which will contaminate the quantum channel leading to an increase in error rate of the detected quantum signals. In one embodiment, clock regenerator 213 will be an avalanche photo diode with high sensitivity such that the intensity of the optical frequency divided clock signal can be as small as possible thereby limiting light scatter into the quantum channel.

Many quantum communication systems rely on gated single photon detectors for sensing the received quantum signals. A promising gated single photon detector which is based on Indium Gallium Arsenide (InGaAs) avalanche photodiodes (APDs) is the self-differencing detector. These detectors operate in the telecom band of 1550 nm. The detectors comprise means to isolate the avalanche signal from the output using a self-differencing detection circuit.

The self-differencing circuit may comprise a signal divider to divide the signal from the detector into two parts and an electrical line to delay one of the parts relative to the other and a signal difference to output the difference between the two parts. The differenced signal is output from the detector which may then be passed through a discriminator.

The self-differencing detector may further comprise a means to balance the strength of the two parts. The detector may further comprise a means to vary the length of the delay. In a further embodiment, the detector further comprises an amplifier(s) to amplify the output of the self-differencing circuit(s).

The self-differencing detector works effectively as it cancels out the APD capacitive response leaving behind the remaining single photon induced avalanches. Consequently, the self-differencing detector can be driven at high clock frequencies (1 GHz or higher) while maintaining relatively high single photon efficiencies (10-20%) low after pulsing (<5%) and low dark count probabilities (<$10^{-5}$). Nevertheless, for accurate capacitive response cancellation, the APD driving clock frequency must be precisely controlled. Small cycle to cycle jitter in the APD driving signal can be significant in degrading the performance of the self-differencing detector.

For optimal performance of the high speed single photon detectors 205 and 305 in the single photon receiver 103, the operation of these detectors will now be described fully with reference to the accompanying drawings, in which an embodiment of the invention is shown.

Figure 5:
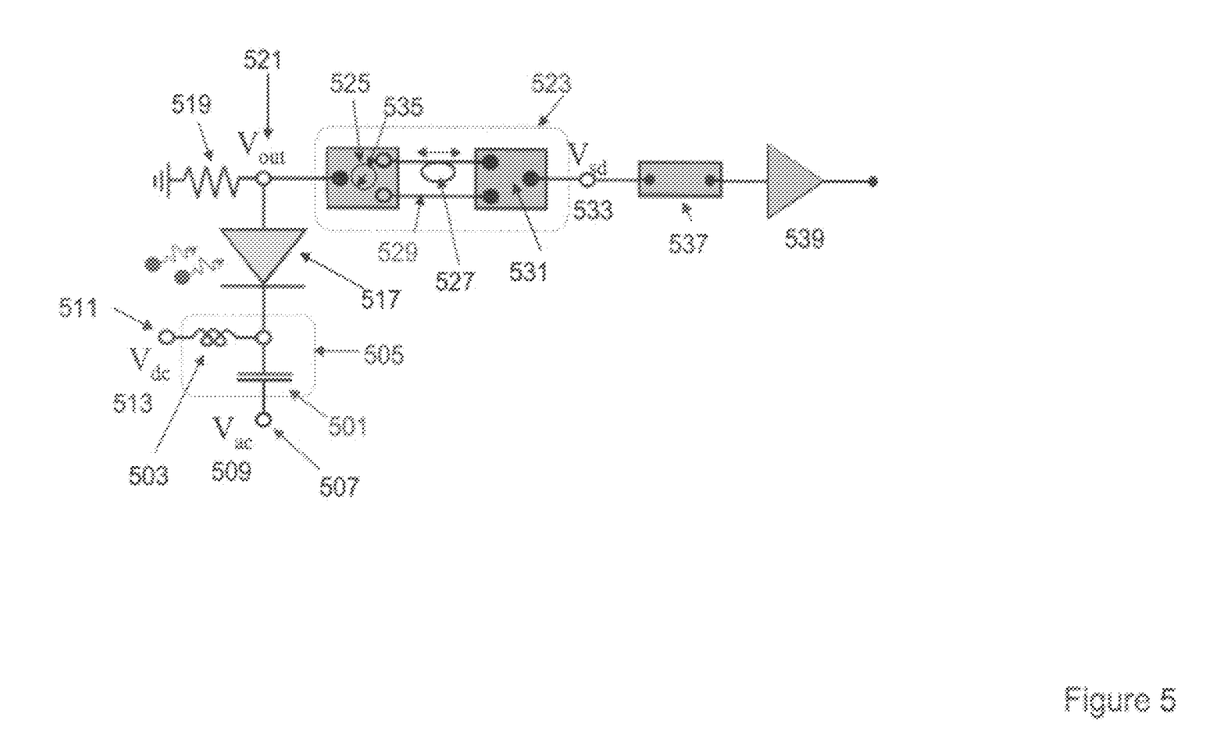
FIG. 5 is a schematic of the self-differencing avalanche photodiode used for single photon detection for the receiver in a communication system.

FIG. 5 shows a high speed single photon detector which may be used with systems in accordance with embodiments of the present invention.

A capacitor 501 and inductor 503 comprise a bias-tee 505, which is used to combine an AC modulation voltage, $V_{ac}$, 507 from an AC voltage source 509 and fixed DC bias $V_{dc}$, 511 from a DC bias source 513. The AC voltage is applied to the arm of the bias-tee which comprises capacitor 501 and the DC voltage is applied to the arm of the bias-tee which comprises inductor 503. The combined AC and DC bias form an avalanche photodiode (APD) bias voltage $V_{apd}$, 515. In one embodiment this APD bias voltage 515 is applied to an Indium Gallium Arsenide (InGaAs) based APD 517, although the APD material type is not limited to InGaAs; it could be silicon or germanium depending on the wavelength sensitivity desired.

The photocurrent induced by an avalanche arising from photon detection results in a voltage across a series resistor 519, which corresponds to an output voltage, $V_{out}$, 521.

Large periodic capacitive response resulting from high speed operation of APD conceals any weak avalanches. A self-differencing circuit is employed 523 to isolate the signal from the avalanche. The self differencing circuit comprises a signal divider 525 which is connected to two electrical lines 527 and 529 which output the divided signal and a signal combiner 531 for combining the signal from the two output lines. One of the electrical output lines 527 and 529 comprises a delay so that the signal from one of the lines is delayed before combination.

The APD output voltage, $V_{out}$, 521 is input into signal divider 525, which divides the signal into two closely equal components. A potentiometer 535 is used to balance the dividing ratio and further equate the two components. Since one of the electrical delay lines 527 is longer than the other 529, one of these components will necessarily be delayed.

The delay is selected to be an integer number of gating periods T supplied by the AC voltage source 513, and the delay line 527 is chosen to be adjustable in order to tune the delay independently of T.

When these two signals are input into a signal differencer 531, they are subtracted one from the other and the strong periodic capacitive response is largely cancelled leaving behind a weak self-differencer output voltage, $V_{sd}$, 533. It is common to use a 1 GHz low-pass filter 537 and linear amplifier 539 to further improve the quality of $V_{sd}$, 533.

This allows weak avalanches to be revealed in the self-differencer output, $V_{sd}$, 533. However, successful cancellation of the capacitive response depends strongly on the cycle-to-cycle jitter (frequency stability) of the APD AC driving signal.

Figure 6:
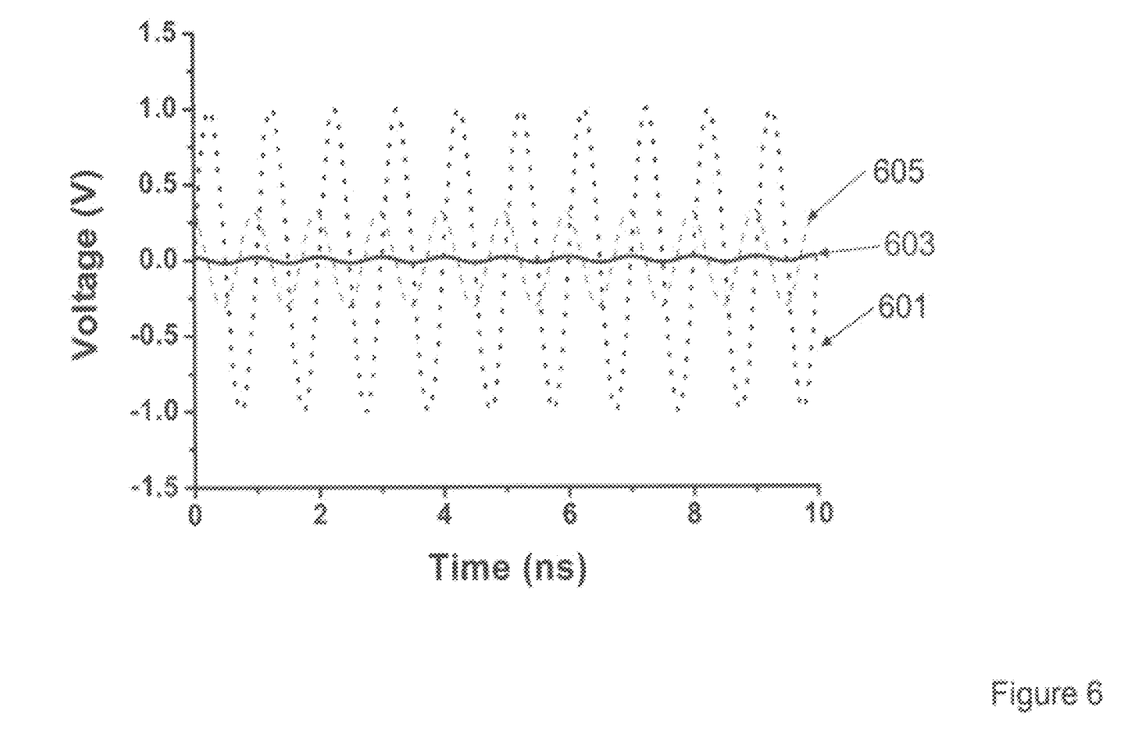
FIG. 6 depicts a graph showing the improvement in the self-differencing capacitive response cancellation when the cycle to cycle jitter is small.

FIG. 6 depicts a graph showing the improvement in the self-differencing capacitive response cancellation when the cycle to cycle jitter is small. The APD driving frequency is 1 GHz.

Curve 601 shows the voltage variation as a function of time of the raw APD signal output (without the self-differencer connected). The voltage variation is of the order of 1V and any weak avalanche is obscured in this capacitive response.

Curve 603 shows the voltage variation as a function of time of the self-differenced APD signal output when the cycle-to-cycle frequency mismatch is 3 ps. Much of the original capacitive response 601 is now cancelled out permitting weak avalanches with amplitudes greater than 20 mV to be observed.

Curve 605 shows the voltage variation as a function of time of the self-differenced APD signal output when the cycle-to-cycle frequency mismatch is only 50 ps. Now the original capacitive response 605 is only partially cancelled and only strong avalanches with amplitudes greater than 300 mV will be observed; an order of magnitude greater than for the situation presented by curve 603.

The single photon detector of FIG. 5 was employed in the system of FIG. 3. The interferometers 301 and 303 and one single photon detector 305 were removed as the experiment was to test only the operation of one single photon self-differencing APD detector using a regenerated clock signal. The experiment resulted in cycle-to-cycle variation of the APD drive frequency of the order of a few ps.

In the experiment, at the single photon transmitter side, 101 quantum laser 307 repetition frequency was 1 GHz driven from master clock 109 and the resulting optical pulses, wavelength 1548 nm, were attenuated to the single photon level of 0.1 photons per pulse before being transmitted along the quantum channel 111 which consisted of 50 km of single mode optical fibre. Master clock 109 was divided by a factor of N=100, to 10 MHz and these frequency divided electrical pulses, were converted into optical clock pulses by a CWDM laser diode operating at 1550 nm inside clock transmitter, 105. Optical clock pulses, were then transmitted over the clock channel, 113 which consisted of 50 km of single mode optical fibre to the clock receiver.

At the clock receiver, 107 the frequency divided clock was detected by clock regenerator which was an avalanche photodiode, 213 whereby the resulting electrical signals were sent into a clock stabiliser, 207.

At the single photon receiver, 103 quantum signals were sent to a self-differencing single photon detector 205. Frequency synthesizer, 203 produced a stable 1 GHz pulse pattern phase locked to the single photon transmitter master clock that was used with an amplifier to drive the APD 205 above and below breakdown, in synchronicity with the incoming quantum signals.

A photon time of arrival histogram is obtained by using a photon timing card which serves to measure the arrival times of the single photon detector macroscopic electrical pulses, from 539 in FIG. 5 and thus by extension register the photon arrival times. Typically a time stamp will be allocated for each photon arrival time.

Furthermore, the photon timing card comprises electrical discriminators for each of the four channels. Discriminators are used to separate electrical noise from true macroscopic electrical pulses caused from photon arrival events. However, there will always be some underlying noise from the single photon detectors which cannot be removed. This is due to single photon detector dark counts.

Figure 7:
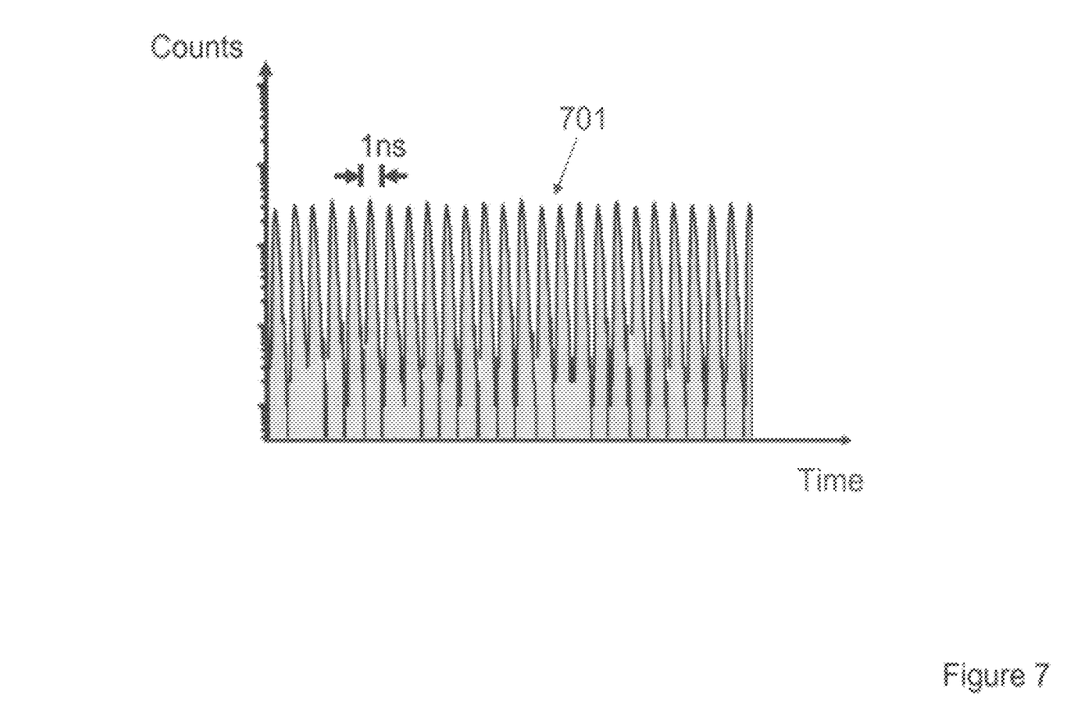
FIG. 7 depicts a histogram of self-differencing avalanche photodiode photon counts as a function of time obtained for an attenuated laser transmitted over 50 km of standard single mode fibre.

The photon timing card stores the photon timestamps in a memory. Photon timestamps are used to build up a temporal photon arrival histogram. FIG. 7 plots the histogram of photon arrival times as a function of time for the self-differencing APD 205 with the conditions as illustrated in FIG. 5.

As expected the photon arrival events are regularly spaced by intervals of 1 ns. Each 1 ns time slot contains a Gaussian distribution of photon arrival times, 701 the full width at half maximum of which is approximately 100 ps. The maximum to minimum ratio of each distribution 701 is over two orders of magnitude. Thus there is minimal overlap between time slots leading to a negligible increase in bit error rate when employed in a full quantum communication system.

Figure 8:
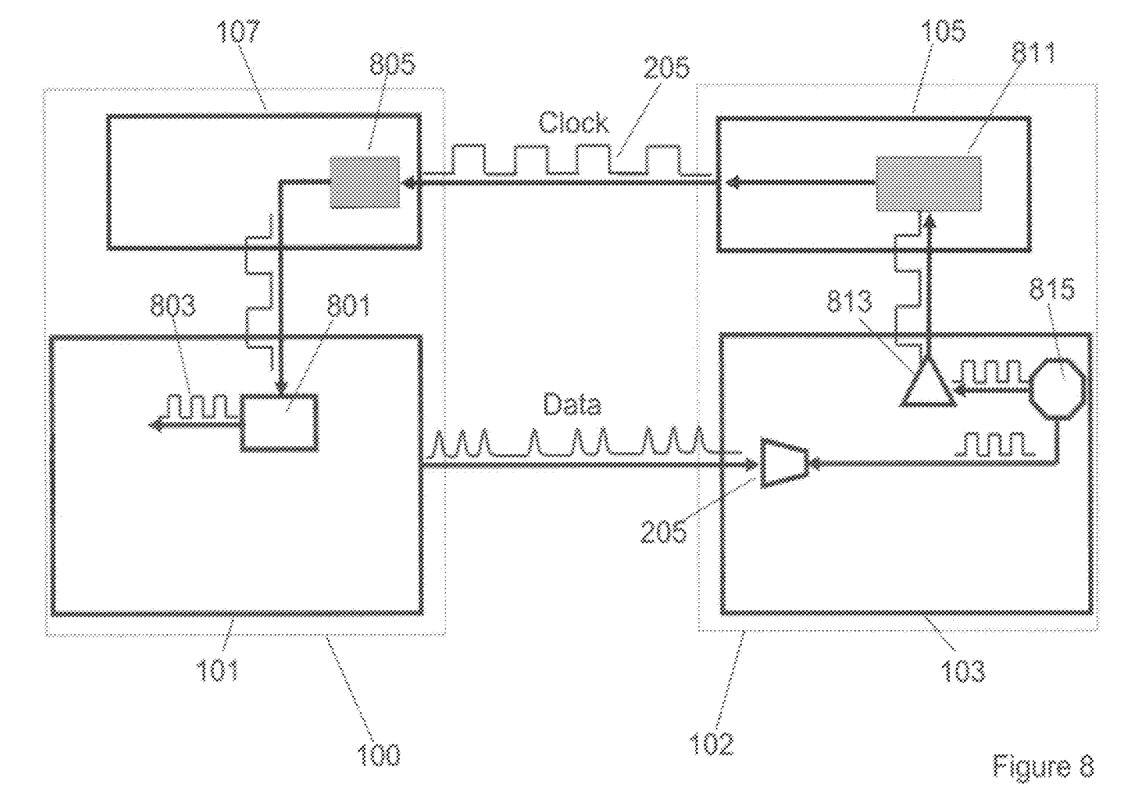
FIG. 8 is a schematic of a communication system in accordance with a further embodiment of the present invention showing a communication system with high speed single photon detectors using low speed clock transmission from the receiver to the transmitter with clock generation and frequency synthesis at the transmitter.

FIG. 8 shows a schematic of a quantum communication system in accordance with a further embodiment. The layout is very similar to new art FIG. 2. However, in this particular embodiment, the master clock, 815 is at the single photon receiver, 103.

Thus, in the system FIG. 8, the receiving section 102 comprises single photon receiver 103. Single photon receiver 103 comprises master clock generator 815. Master clock 815 generates electrical signal at the clock rate of the system. This electrical clock signal is used to drive the high speed single photon detector(s), 205 as well as a clock divider, 813. The clock divider, 813 divides the master clock signal, 815 to some pre-set divided frequency, N. In one embodiment, an ovenised master clock is employed as it will have exemplary timing stability. Generally speaking the pre-set divided signal will have a frequency that is one to three orders of magnitude smaller than the master clock.

In one embodiment, this divided clock is converted to an optical signal, with clock transmitter 105. In this embodiment, the clock transmitter 105 is located in the receiving section 102. In one embodiment, the dividing of the clock signal is performed using a coarse division wavelength multiplexed (CWDM) laser diode, 811; although a dense division wavelength multiplexed (DWDM) laser diode could be used. The optical signal, is then sent through the clock channel to the clock receiver 107. In this embodiment, the clock receiver 107 is located in the transmission section 100.

At the clock receiver, 107, the frequency divided clock 205 is converted into an electrical signal by a clock regenerator. In one embodiment, this is performed using an avalanche photodiode 805; however any photoreceiver could be used. Clock receiver, 107 sends this clock regenerated signal to a frequency synthesizer in single photon transmitter, 101.

Single photon transmitter 101 comprises frequency synthesizer 801. The purpose of the frequency synthesizer 801 is to track the input variations of the clock signal, 205 and generate a frequency multiplied version of the clock signal. In one embodiment, the frequency synthesizer is realised by a phase locked loop (PLL). PLL's are readily available as on chip devices. Such devices allow a preset frequency multiplier for the output frequency. In this embodiment, this multiplier is set at the value N to regenerate the original high frequency master clock output 815 (at the data transmitter). Any variations in the input clock frequency will be automatically tracked by the frequency synthesizer thus keeping both single transmitter master clock and the single photon receiver master clock in phase.

The regenerated master clock, can have very low jitter and excellent timing performance. This recovered clock is used to drive high speed (GHz) electronics in the data transmitter such as pulsed laser for generating the data stream. This data stream is then synchronised with the high speed single photon detectors at the receiver 103.

Figure 9:
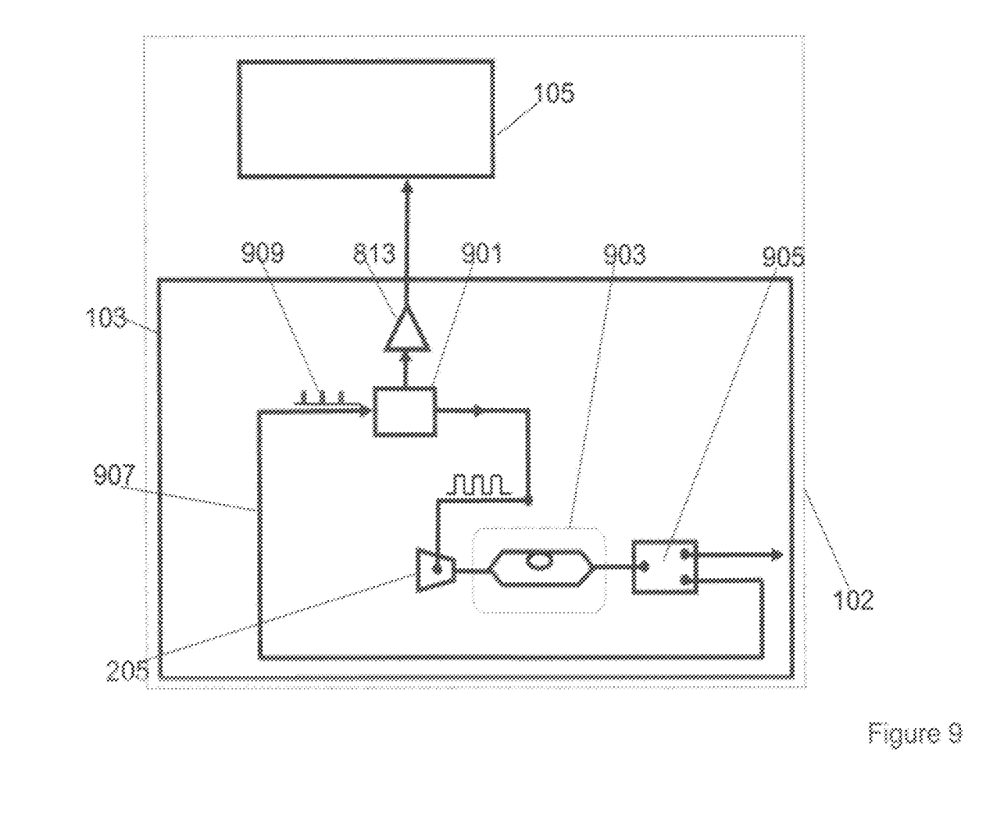
FIG. 9 is a schematic of a communication system in accordance with a further embodiment of the present invention showing detail of the receiver using the self-differencing circuit to set the clock rate of the transmitter/receiver system whereby the frequency is controlled by feed back from the self-differencing circuit.

FIG. 9 shows a schematic of a receiving unit in accordance with a further embodiment of the present invention. The setup is based upon FIG. 8, and will be referenced as such.

The master clock 815 in FIG. 8 is replaced with a feedback arrangement based on the self-differencing circuit. In detail, the receiving section 102 comprises a single photon detector 205 which is the same as previously described. The output of the single photon detector is passed through self differencing circuit 903. This operates on the principle of the self differencing circuit previously described where the output is divided into two channels and one channel is delayed relative to the other channel. The two channels are then combined in signal combiner, which forms the output of the self-differencer 903. Output of self-differencer 903 feeds a signal splitter 905.

The feedback uses delay in the self-differencer 903 to fix the frequency of a voltage controlled oscillator VCO 901. In this way, if there is any drift in the two self-differencer arms the frequency will be adjusted to compensate, thus maintaining optimal performance of the high speed single photon detector 205.

The VCO 901 generates a high frequency (which is set at the clock frequency of the system). The clock frequency is outputted to drive both the high speed single photon detector and the frequency divider 813. As previously explained, with reference to FIG. 5, the capacitive response of the detector output is removed by the subtracting one clock cycle with the previous clock cycle using the self-differencing circuit 903. The output of the self-differencer is sent to a resistive splitter 905 where one output is sent to timing electronics of the receiver for photon timestamp capture, and the other output is sent back, 907 to the VCO 901.

If the clock frequency from the VCO does not match the self-differencer, there will be a fraction of the capacitive response that is uncancelled 909. This uncancelled signal can be used as voltage feedback into the VCO to adjust the VCO frequency to the correct frequency. When the clock frequency matches the inverse time delay of the self-differencer, the uncancelled output 909 will be zero.

While certain embodiments have been described, these embodiments have been presented by way of example only, and are not intended to limit the scope of the inventions. Indeed the novel methods, systems and units described herein may be embodied in a variety of other forms; furthermore, various omissions, substitutions and changes in the form of methods, systems and units described herein may be made without departing from the spirit of the inventions. The accompanying claims and their equivalents are intended to cover such forms of modifications as would fall within the scope and spirit of the inventions.

The invention claimed is:

1. A communication system comprising an emitter of weak light pulses, a detector which is capable of detecting single photons, and a source of a clock signal, wherein said emitter and detector are synchronised using said clock signal, the system further comprising a frequency divider for said clock signal to produce a reduced frequency clock signal and a clock regenerator for regenerating the original clock signal from the reduced frequency clock signal, the system further comprising a communication channel configured to communicate the clock signal between the emitter and detector, the clock signal being reduced before sending through said channel and reconstructed after it has exited said channel.

2. A communication system according to claim 1, wherein the component is a detector and the detector is a high speed detector.

3. A communication system according to claim 2, wherein the high speed detector is an avalanche photo-diode detector.

4. A communication system according to claim 3, further comprising an output circuit configured to isolate an avalanche signal from the output of the detector using a self-differencing technique.

5. A communication system according to claim 4, wherein the output circuit comprises a signal divider to split the output signal of the detector into two parts, an electrical line to delay one of the parts with relative to the other and a signal differencer to output the difference between the two parts.

6. A communication system according to claim 5, wherein the output circuit further comprises a potentiometer configured to balance the strength of the two parts of the output signal.

7. A communication system according to claim 2, wherein the high speed detector is gated at a frequency of at least 100 MHz.

8. A communication system according to claim 4, wherein the source of the clock signal and frequency divider are located with the detector and the clock regenerator is located with the emitter, the source of the clock signal comprising a voltage controlled oscillator, and wherein a signal from the output circuit is connected to voltage controlled oscillator to provide a feedback signal to said voltage controlled oscillator.

9. A communication system according to claim 5, wherein the output circuit comprises a variable delay line provided in the path of one of the two parts of the signal such that the delay between the two parts can be varied.

10. A communication system, according to claim 1, wherein said frequency divider reduces the frequency by a factor of 10 or more.

11. A communication system according to claim 1, wherein source of the clock signal and frequency divider are located with the emitter and the clock regenerator is located with the detector.

12. A communication system according to claim 1, wherein source of the clock signal and frequency divider are located with the detector and the clock regenerator is located with the emitter.

13. A communication system according to claim 1, wherein the reduced frequency clock signal is transmitted over the same channel as the signal from the emitter, using wavelength division multiplexing.

14. A communication system according to claim 1, configured as a quantum communication system.

15. A communication system according to claim 14, an apparatus for clock regeneration in a communication system using gated high speed single photon detectors wherein the quantum communication system is a quantum key distribution system.

16. A communication method comprising:
generating weak light pulses using an emitter,
detecting said weak light pulses using a detector which is capable of detecting single photons;
providing a clock signal to synchronise said detector with the emitter, wherein providing a clock signal comprises generating a clock signal at a first frequency, providing said clock signal at said first frequency to one of the emitter or detector; dividing the frequency of the clock signal to produce a reduced frequency clock signal and regenerating the clock signal at the first frequency from the reduced frequency clock signal before supplying to the other of the emitter or detector, wherein said emitter and detector are spatially separated and a communication channel is provided to communicate the reduced frequency clock signal between the emitter and detector.

* * * * *